US010824359B2

(12) United States Patent
Armangau et al.

(10) Patent No.: US 10,824,359 B2
(45) Date of Patent: Nov. 3, 2020

(54) OPTIMIZING INLINE DEDUPLICATION DURING COPIES

(71) Applicant: EMC IP Holding Company LLC, Hopkinton, MA (US)

(72) Inventors: Philippe Armangau, Acton, MA (US); John Gillono, North Chelmsford, MA (US); Maher Kachmar, Marlborough, MA (US); Christopher A. Seibel, Walpole, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 156 days.

(21) Appl. No.: 15/798,740

(22) Filed: Oct. 31, 2017

(65) Prior Publication Data

US 2019/0129639 A1    May 2, 2019

(51) Int. Cl.
*G06F 16/17* (2019.01)
*G06F 3/06* (2006.01)
*G06F 16/13* (2019.01)
*G06F 16/174* (2019.01)

(52) U.S. Cl.
CPC ............ *G06F 3/0641* (2013.01); *G06F 3/065* (2013.01); *G06F 3/0608* (2013.01); *G06F 16/137* (2019.01); *G06F 16/1748* (2019.01); *G06F 3/067* (2013.01)

(58) Field of Classification Search
CPC .... G06F 16/137; G06F 16/1748; G06F 3/065; G06F 16/27; G06F 16/9014
See application file for complete search history.

(56) References Cited

U.S. PATENT DOCUMENTS

| | | | |
|---|---|---|---|
| 8,190,850 B1 | 5/2012 | Davenport et al. | |
| 8,412,688 B1 | 4/2013 | Armangau et al. | |
| 8,495,304 B1 * | 7/2013 | Natanzon | G06F 11/1453 |
| | | | 711/133 |
| 9,400,792 B1 | 7/2016 | Bono et al. | |
| 9,442,941 B1 * | 9/2016 | Luz | H04L 67/1097 |
| 9,569,455 B1 | 2/2017 | Bono et al. | |
| 9,891,857 B2 * | 2/2018 | Akirav | G06F 3/0641 |
| 2013/0238876 A1 * | 9/2013 | Fiske | G06F 3/0641 |
| | | | 711/216 |

OTHER PUBLICATIONS

Li et al. "CacheDedup: In-line Deduplication for Flash Caching" Usenix the advanced computing systems Association, Feb. 22-25, 2016, Santa Clara, CA, USA.*

* cited by examiner

*Primary Examiner* — Etienne P Leroux
*Assistant Examiner* — Cindy Nguyen
(74) *Attorney, Agent, or Firm* — BainwoodHuang

(57) ABSTRACT

A technique for storing data in a data storage system detects that a read is being performed pursuant to a data copy request. In response, the data storage system stores a digest of the data being read in an entry of a digest cache. Later, when a write pursuant to the same copy request arrives, the storage system obtains the entry from the digest cache and completes the write request without creating a duplicate copy of the data.

21 Claims, 5 Drawing Sheets

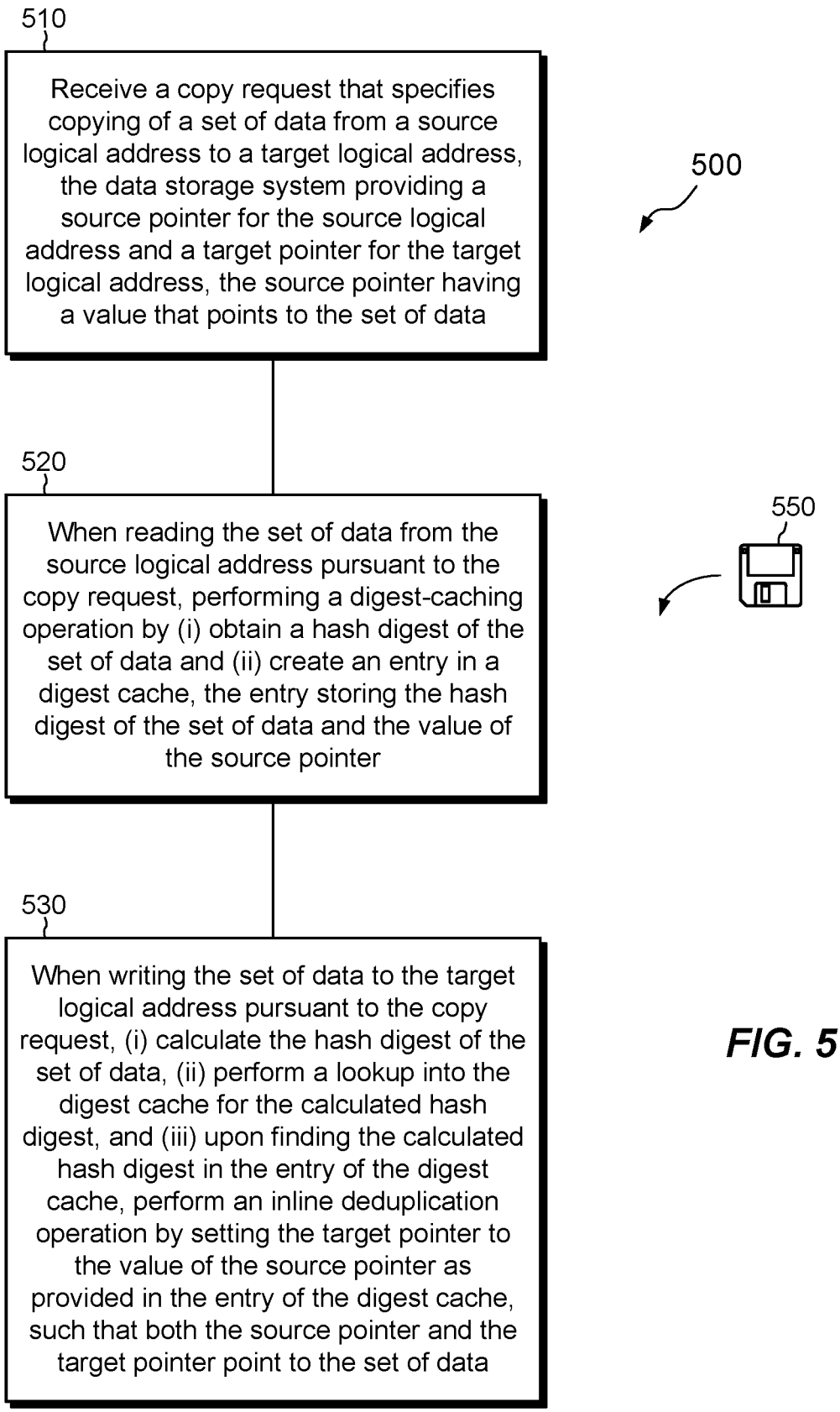

OPTIMIZING INLINE DEDUPLICATION DURING COPIES

BACKGROUND

Data storage systems are arrangements of hardware and software that include storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, deleted, and so forth. Software running on the storage processors manages incoming storage requests and performs various data processing tasks to organize and secure the data elements stored on the non-volatile storage devices.

Data storage systems commonly store data in blocks, where a "block" is a unit of storage allocation, such as 8 KB or some other size, which is typically uniform. A data storage system may arrange blocks into larger structures, such as LUNs (Logical UNits), file systems, and the like.

Some data storage systems employ deduplication. For example, a program searches a storage system for data blocks having identical values. The program then replaces duplicate blocks with pointers to a single retained copy. Deduplication can save considerable storage space in systems that would otherwise store multiple copies of the same data. Consider, for example, an email server at a company where all employees receive the same message and attachments. Deduplication enables a data storage system to store such messages and attachments while consuming a minimum of storage space.

SUMMARY

Conventional approaches to deduplication run in the background, where a deduplication program reads data from storage drives, computes digests, searches for duplicates by comparing digests, and configures metadata when duplicates are found. As is known, a "digest" is a value that represents and identifies a set of data, such as a result of performing a hash function on the set of data.

Unfortunately, background deduplication can result in large numbers of disk accesses, which can interfere with more critical data storage functions, especially when a data storage system is busy servicing host applications. Also, running deduplication in the background can result in an over-provisioning of storage space, as greater amounts of storage space are needed to accommodate initial writes of data than are required to store the same data after deduplication has finished.

It has been recognized that data storage systems may perform deduplication inline with storage requests, such that a storage system searches for duplicate copies in response to newly-arriving writes and adjusts metadata when duplicates are found, thus avoiding the initial creation of duplicate copies and reducing overprovisioned storage. Performing deduplication inline with storage requests can still be burdensome to a storage system, however, as it may require considerable processing and access to data. What is needed is a way to improve the efficiency of inline deduplication.

With the foregoing in mind, an improved technique for storing data in a data storage system detects that a read is being performed pursuant to a data copy request. In response, the data storage system stores a digest of the data being read in an entry of a digest cache. Later, when a write pursuant to the same copy request arrives, the storage system obtains the entry from the digest cache and completes the write request without creating a duplicate copy of the data.

Advantageously, the improved technique leverages the fact that a write of data closely follows a read of the same data when performing a copy. Deduplication activities may thus apply information about the data, which is acquired when performing the read, to improve the efficiency of data processing when performing the write.

Certain embodiments are directed to a method of copying data in a data storage system. The method includes receiving a copy request that specifies copying of a set of data from a source logical address to a target logical address, the data storage system providing a source pointer for the source logical address and a target pointer for the target logical address, the source pointer having a value that points to the set of data. When reading the set of data from the source logical address pursuant to the copy request, the method further includes performing a digest-caching operation by (i) obtaining a hash digest of the set of data and (ii) creating an entry in a digest cache, the entry storing the hash digest of the set of data and the value of the source pointer. When writing the set of data to the target logical address pursuant to the copy request, the method still further includes (i) calculating the hash digest of the set of data, (ii) performing a lookup into the digest cache for the calculated hash digest, and (iii) upon finding the calculated hash digest in the entry of the digest cache, performing an inline deduplication operation by setting the target pointer to the value of the source pointer as provided in the entry of the digest cache, such that both the source pointer and the target pointer point to the set of data.

Other embodiments are directed to a computerized apparatus constructed and arranged to perform a method of copying data, such as the method described above. Still other embodiments are directed to a computer program product. The computer program product stores instructions which, when executed on control circuitry of a computerized apparatus, cause the computerized apparatus to perform a method of copying data, such as the method described above.

The foregoing summary is presented for illustrative purposes to assist the reader in readily grasping example features presented herein; however, the foregoing summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

FIG. 5 is a flowchart showing an example method for copying data.

DETAILED DESCRIPTION OF THE INVENTION

Embodiments of the invention will now be described. One should appreciate that such embodiments are provided by way of example to illustrate certain features and principles of the invention but that the invention hereof is not limited to the particular embodiments described.

An improved technique for storing data in a data storage system detects that a read is being performed pursuant to a data copy request. In response, the data storage system stores a digest of the data being read in an entry of a digest cache. Later, when a write pursuant to the same copy request arrives, the storage system obtains the entry from the digest cache and completes the write request without creating a duplicate copy of the data.

Figure 1:
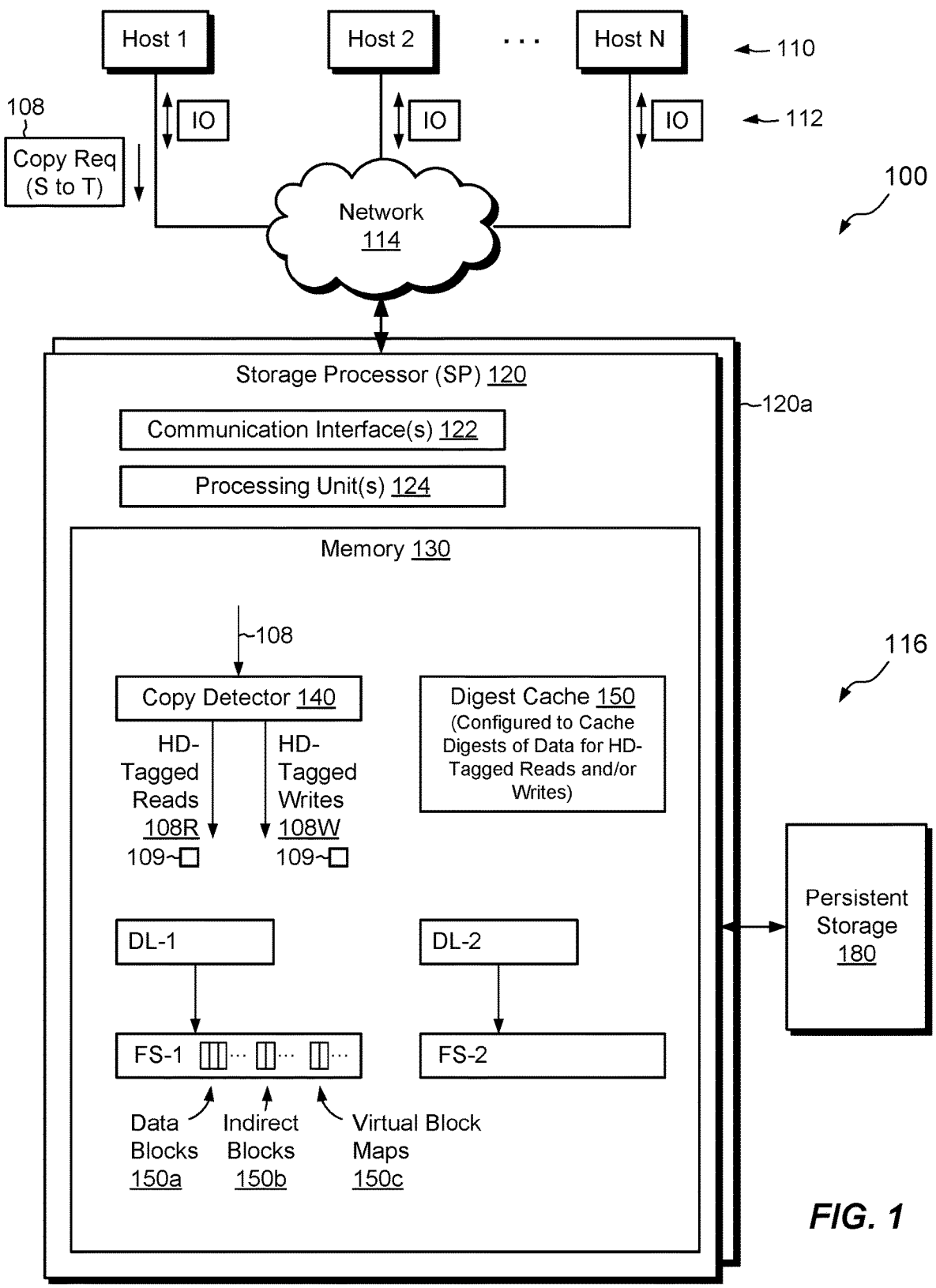
FIG. 1 is a block diagram of an example environment in which the improved technique hereof can be practiced.

FIG. 1 shows an example environment 100 in which embodiments of the improved technique hereof can be practiced. Here, multiple host computing devices ("hosts") 110 access a data storage system 116 over a network 114. The data storage system 116 includes a storage processor, or "SP," 120 and persistent storage 180, such as magnetic disk drives, electronic flash drives, and the like. The data storage system 116 may include multiple SPs like the SP 120 (e.g., a second SP 120a). In an example, multiple SPs may be provided as circuit board assemblies, or "blades," which plug into a chassis that encloses and cools the SPs. It is understood that no particular hardware configuration is required, however, as any number of SPs may be provided, including a single SP, and the SPs can be any type of computing device capable of processing host IOs.

The network 114 may be any type of network or combination of networks, such as a storage area network (SAN), a local area network (LAN), a wide area network (WAN), the Internet, and/or some other type of network or combination of networks, for example. The hosts 110 may connect to the SP 120 using various technologies, such as Fibre Channel, iSCSI (Internet small computer system interface), NFS (network file system), and CIFS (common Internet file system), for example. Any number of hosts 110 may be provided, using any of the above protocols, some subset thereof, or other protocols besides those shown. As is known, Fibre Channel and iSCSI are block-based protocols, whereas NFS and CIFS are file-based protocols. The SP 120 is configured to receive IO requests 112 according to block-based and/or file-based protocols and to respond to such IO requests 112 by reading or writing the storage 180.

The SP 120 includes one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory, e.g., Random Access Memory (RAM), and non-volatile memory, such as one or more ROMs (Read-Only Memories), disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 "includes," i.e., realizes by execution of software instructions, a copy detector 140, a digest cache 150, a first data log DL-1 for logging writes to a first file system FS-1, and a second data log DL-2 for logging writes to a second file system FS-2. The copy detector 140 is configured to detect copy instructions 108 arriving from hosts 110, as well as copy instructions 108 arising internally within the data storage system 116. The copy detector 140 is further configured to tag read requests 108R with HD (highly-dedupable) tags, when reads are performed pursuant to copies, and to tag write requests 108W with HD tags, when writes are performed pursuant to copies. A read or write as described herein is "pursuant" to a copy operation if it is performed as part of the copy operation, which inherently involves a read of data and a write of the same data.

The digest cache 150 is configured to store entries of digests of data for tagged reads and/or writes. Each digest is preferably the result of performing a hash function on a respective set of data. Each digest may be between tens and hundreds of bits in length. Examples of suitable hash functions include SHA-1 and SHA-2 ("SHA" is an acronym for "Secure Hash Algorithm"). The hash functions produce, with high statistical certainty, different results for different data but the same results for the same data. Digests are thus effective tools for comparing data that are much larger than the digests themselves. The digest cache 150 is preferably implemented in volatile memory (e.g., DRAM), such that it can be accessed at high speed.

DL-1 is a data log for file system FS-1. For example, DL-1 is configured to capture data specified by write requests directed to file system FS-1 and to quickly acknowledge the writes. In an example, DL-1 is constructed from volatile memory (e.g., DRAM), which may be battery-backed and mirrored to another SP (e.g., SP 120a), enabling data stored in DL-1 to be deemed persisted once stored, even though the data resides in volatile memory. Later, out of band with particular write requests, DL-1 may be configured to flush data to persistent structures in the file system FS-1.

In an example, file system FS-1 is arranged in blocks, with different groups of blocks serving different purposes. For example, blocks 150a are configured to store data (e.g., file data), whereas blocks 150b are configured to store indirect blocks (IBs) and blocks 150c are configured to store virtual block maps (VBMs). The file system FS-1 may include other types of blocks, such as blocks storing inodes (index nodes) and other metadata structures. As is known, inodes store per-file metadata, where each inode stores attributes and mapping information about a respective file. Indirect blocks (IBs) store arrays of block pointers for mapping file data. For example, an inode may point to an IB, which may point to other IBs, eventually pointing to leaf IBs, which point directly to data blocks or to VBMs. VBMs point to data blocks or to other VBMs, with data blocks forming the endpoint of each path. VBMs may assist with block virtualization and deduplication. Blocks in FS-1 may be arranged in a physical address space, which ranges from zero to some large number, and with each block having a unique address, which may be identified by file system block number, or "FSBN." In an example, FS-1 is laid out on a volume (not shown), which is backed by persistent storage 180.

In some examples, FS-1 stores one or more container files, where each container file provides a file-based representation of a host-accessible data object, such as a host-accessible LUN (Logical UNit) or a host-accessible file system. Thus, an entire LUN or file system may be contained within a single container file of FS-1. Where a container file stores a host-accessible file system, the files of that file system may themselves store large objects, such as virtual machine disks.

DL-2 is similar in construction to DL-1, but is configured to cache writes directed to FS-2, which may be similar in construction to FS-1. In an example, FS-1 and FS-2 form respective deduplication domains. For example, the data storage system 116 may support deduplication within FS-1 and within FS-2, but not between FS-1 and FS-2.

In example operation, the hosts 110 issue IO requests 112 to the data storage system 116. The SP 120 receives the IO requests 112 at the communication interfaces 122 and initiates further processing. Such processing may involve performing reads and writes to contents of FS-1 and/or FS-2.

At some point during operation, a host 110 or administrator directs the data storage system 116 to perform a copy of data. For example, a host 110 running ESX Server may issue an XCOPY command to clone a virtual machine (ESX Server is available from VMWare Corporation of Palo Alto, Calif.). Alternatively, a Microsoft Windows entity may issue an ODX (Offloaded Data Transfer) command to copy data. As yet another example, an administrator or host may specify a data migration or other copy within the data storage system 116. In any case, the data storage system 116 or some software construct running therein receives a request 108 to perform a copy of specified data. The request 108 specifies a source S and a target T, which may be expressed in any suitable manner (e.g., as files, directories, offsets, addresses, etc.)

Copy detector 140 receives the copy request 108. Working in coordination with other software constructs (not shown), the copy detector 140 maps the source S and target T of the copy request 108 to respective logical addresses in the data storage system 116. For example, a source logical address for the source S corresponds to a first offset within a file, and the target logical address for the target T corresponds to a second logical offset, which may be within the same file or within a different file, and may be in the same file system or in a different file system.

The copy detector 140 then proceeds to issue a read request 108R. As the read request 108R is pursuant to the copy request 108, the copy detector 140 applies an HD (highly-dedupable) tag 109 to the read request 108R. For example, the data storage system 116 employs the same logic for performing all reads, regardless of whether they are pursuant to copies. The HD tag 109 thus serves to distinguish reads that are pursuant to copies from reads that are not.

When performing the read, e.g., after identifying a mapping from the source logical address to the requested set of data, the data storage system 116 checks the read request for the HD tag 109. If the HD tag 109 is found, the data storage system 116 proceeds to create a new entry in the digest cache 150 (e.g., assuming no identical entry already exists). The new entry may include, for example, a digest of the set of data, an identifier of the set of data (such as a pointer to the data), and an identifier of a deduplication domain (e.g., file system) to which the set of data belongs.

Next, the copy detector 140 proceeds to issue a write request 108W pursuant to the same copy request 108. The copy detector 140 may optionally tag the write request 108W with an HD tag 109. When processing the write request 108W, the data storage system 116 computes a digest for the set of data and looks into the digest cache 150. In some examples, the presence of the tag 109 triggers the act of looking into the digest cache 150. Alternatively, checking the digest cache 150 may be part of the standard processing of writes in the data storage system 116, such that no tag 109 on the write request 108W is needed. If checking the digest cache 150 results in a match, the data storage system 116 proceeds to deduplicate in place. For example, rather than allocating new storage space for the data to be written, the storage system instead directs pointers such that the target logical address points to the same data that was read when processing the read request 108R. The creation of duplicate data is thus efficiently avoided.

Figure 2:
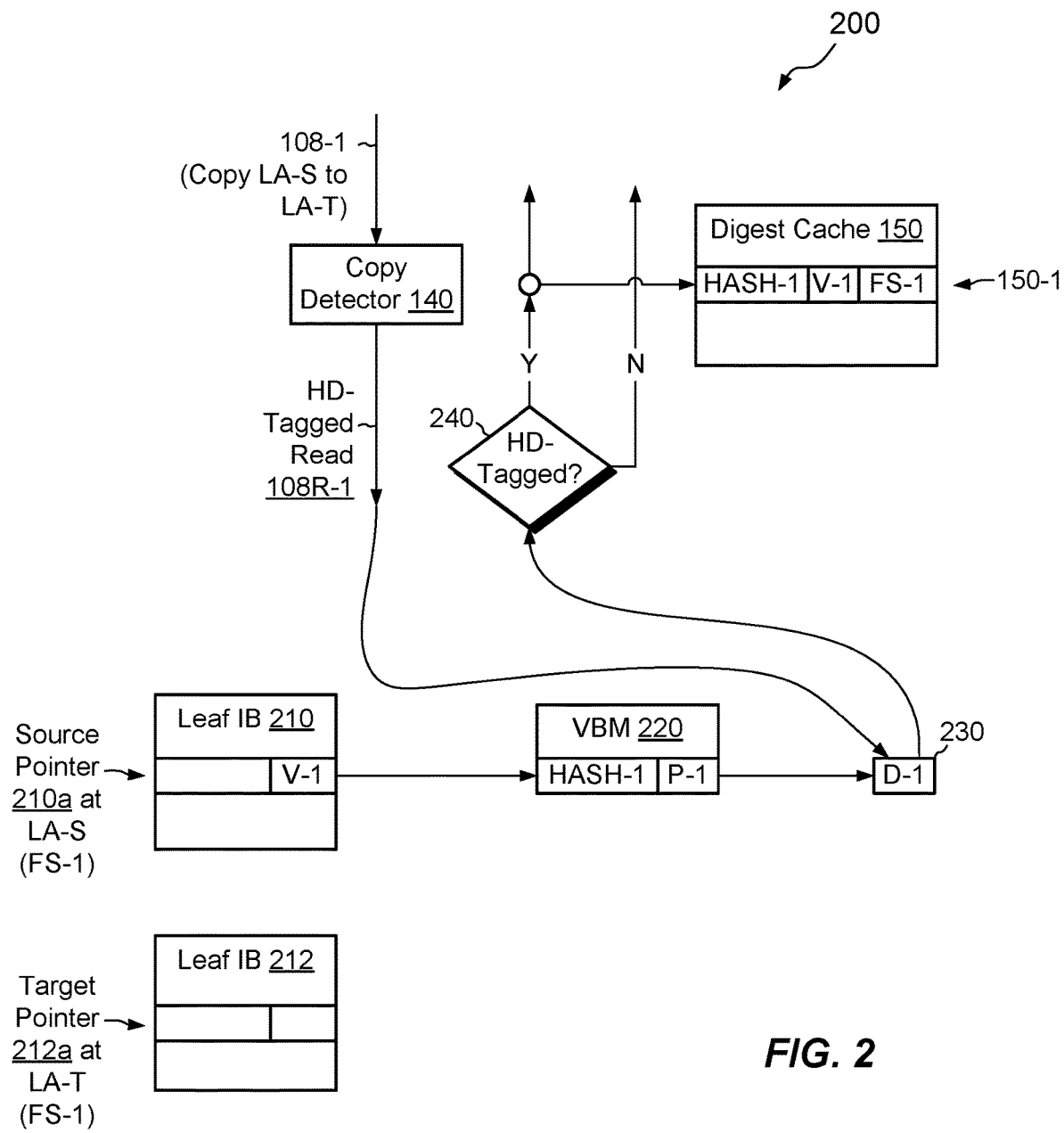
FIG. 2 is a diagram showing an example arrangement for performing a digest-caching operation in the environment of FIG. 1, when performing a read pursuant to a copy request.

FIG. 2 shows in greater detail an example arrangement 200 for processing of a read pursuant to a copy request 108-1. Here, copy request 108-1 specifies a copy of a set of data D-1 from a source logical address LA-S to a target logical address LA-T. A source pointer 210a within a first leaf IB (indirect block) 210 participates in mapping the source logical address LA-S to the data D-1, and a target pointer 212b within a second leaf IB 212 participates in mapping the target logical address LA-T. As an initial condition, source pointer 210a has a value V-1 that points to a VBM 220, which in turn points to a data block 230, which stores the data D-1. Target pointer 212a may initially be empty. In this example, both the source and the target reside within the same file system, FS-1. The source and target may be part of the same file, or they may be parts of different files. The leaf IBs 210 and 212, the VBM 220, and the data block 230 may each be provided by blocks within FS-1.

In operation, the copy detector 140 issues a tagged read request 108R-1, which is directed to the source logical address LA-S. The data storage system 116 locates data D-1, e.g., by following the source pointer 210a to VBM 220, and then by following a pointer P-1 in VBM 220 to the block 230, which contains D-1. In following the mapping to D-1, the data storage system 116 may identify and store in memory the value V-1 of the source pointer 210a as well as a digest for D-1, i.e., HASH-1, which may have previously been stored in VBM 220. The data storage system 116 then checks the read request 108R-1 (decision 240), to determine whether it has an HD tag 109. If the request 108R-1 has the HD tag 109, the data storage system 116 performs a digest-caching operation, in which it creates a new entry 150-1 in the digest cache 150. The new entry 150-1 may include the digest of D-1, i.e., HASH-1, as well as the value V-1 of the source pointer 210a and an identifier FS-1 of a deduplication domain. These values are generally already stored in memory, such that no additional disk access is required to obtain them. If, at decision 240, the request 108R1 has no HD tag 109 (e.g., because the read is not pursuant to a copy), the read request 108R-1 proceeds in the normal course, without performing a digest-caching operation.

The arrangement 200 should be understood to be an example rather than limiting. In some cases, no digest for D-1 is stored in VBM 220. In such cases, the data storage system 116 may compute a digest for D-1, e.g., by applying an appropriate hashing algorithm to data D-1. Also, other embodiments may exclude VBM 220 altogether, such that the source pointer 210*a* points directly to the data block 230. In such cases, the source pointer 210*a* may itself store HASH-1, or HASH-1 may be omitted from any pointing structure, such that the digest-caching operation computes HASH-1 rather than accessing it from memory. Also, the digest-caching operation may store other identifiers besides pointer values, like V-1. For example, other identifiers that provide the location of data D-1 may be used. In some examples, the data D-1 is stored in compressed form, such that it occupies less than a full block of data. For example, the VBM 220 may point to a segment of multiple contiguous blocks in file system FS-1. In such situations, the VBM 220 may include metadata for accessing particular compressed extents within the segment, where each extent has a logical size of one block (corresponding to one pointer in a leaf IB), even though its physical size is less than a block. In such cases, the pointer in entry 150-1 (shown as V-1) may include both a block identifier of VBM 220 and an index, which identifies the compressed extent storing D-1 within the segment.

Figure 3:
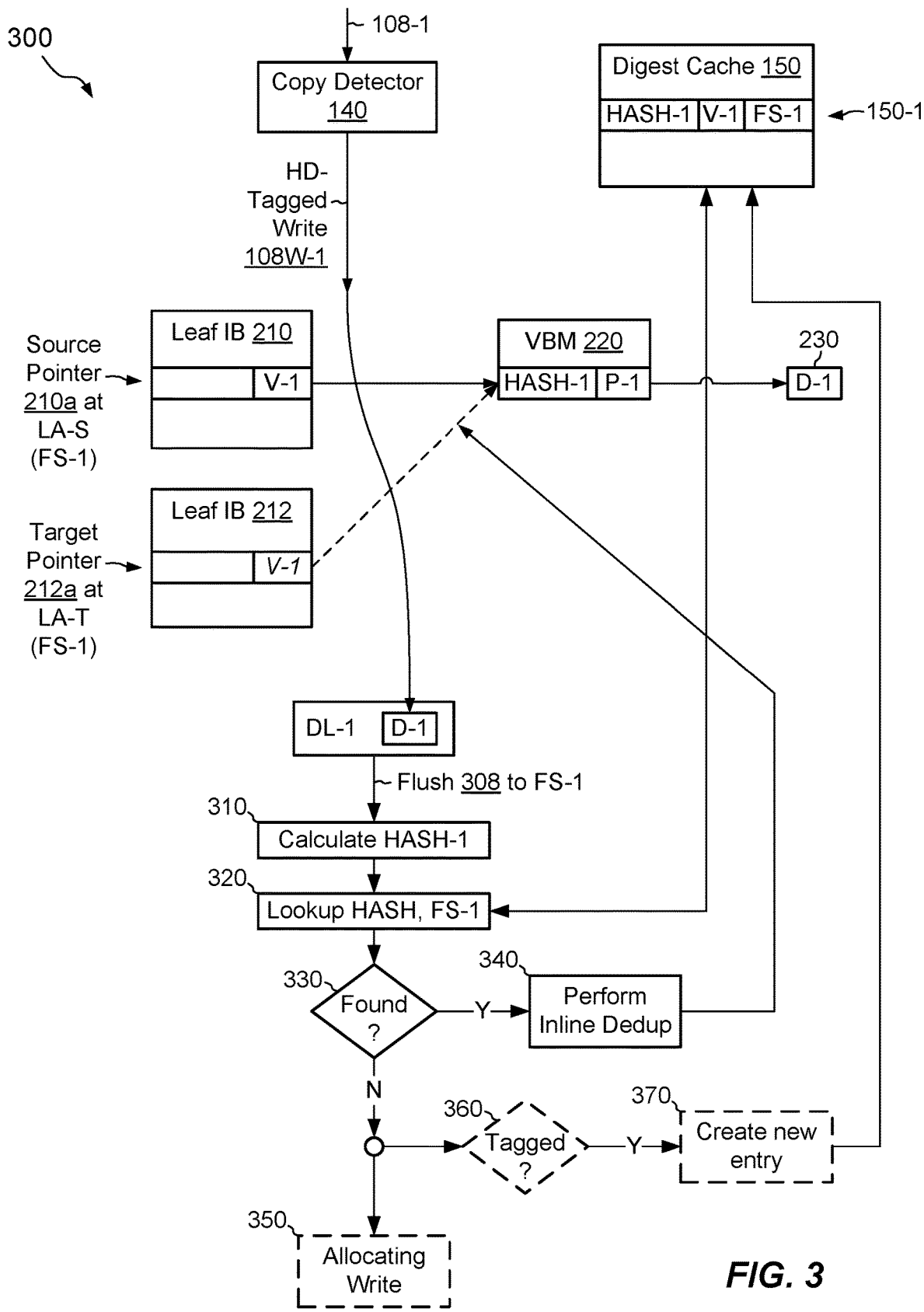
FIG. 3 is a diagram showing an example arrangement for performing a deduplication in place when performing a write pursuant to a copy request.

FIG. 3 shows an example arrangement 300 for performing a write pursuant to the copy request 108-1 in FIG. 2. Thus, for example, the write shown in FIG. 3 is the write that follows the read in FIG. 2, i.e., to complete the copy request 108-1.

Here, copy detector 140 issues a write request 108W-1, pursuant to the copy request 108-1. The write request 108W-1 is optionally tagged with an HD tag 109. The data storage system 116 processes the write 108W-1 using its standard write logic. For example, the data storage system 116 may be responding to many write requests at or around the same time it responds to write request 108W-1. Some of these write requests may be pursuant to copies, but others may not.

In example operation, the write request 108W-1 propagates to the data log DL-1 and stores the data D-1 in DL-1. For example, the storage system stores data D-1, which was read according to the arrangement of FIG. 2, in battery-backed, mirrored DRAM of DL-1. Once the data D-1 are persisted in DL-1, the data storage system 116 may acknowledge the write back to the host 110 or other requestor.

At some later point, the data log DL-1 performs a flush 308 of the D-1 to FS-1. At this point, the storage system determines whether to deduplicate D-1 in place or to write a fresh copy of D-1 to a second location in FS-1. For example, the storage system calculates a digest (HASH-1) of the data D-1 (step 310) and proceeds to perform a look-up (step 320) into the digest cache 150 for the computed digest and the deduplication domain FS-1. In this case, the look-up at step 320 identifies cache entry 150-1. Decision 330, which determines whether a matching entry has been found, evaluates to "Y," and operation proceeds to step 340, were an inline deduplication operation is performed. For example, step 340 takes the pointer value V-1 from the entry 150-1 and places that value in target block pointer 212*a*. Thus, both the source pointer 210*a* and the target pointer 212*a* point to the same location, in this case that of VBM 220. It is therefore not necessary to allocate a new data block to accommodate the write 108W-1, as the write is deduplicated in place.

In some examples, the storage system may trigger calculation of a hash value (step 310) and a look-up into the digest cache 150 (step 320) based on the presence or absence of an HD tag 109 in a write request. For example, the standard processing of writes may be configured to check write requests for HD tags 109 and (i) calculate hash values and (ii) perform lookups into the digest cache 150 only if an HD tag is present. Alternatively, the standard write logic may always calculate hash values and perform look-ups into the digest cache 150, regardless of whether the HD tag 109 is present or not.

FIG. 3 also shows write logic for cases in which no matching entry is found in the digest cache 150, i.e., when decision 330 evaluates to "N." In this case, the storage system performs an allocating write (step 350) of the data D-1, i.e., it does not perform inline deduplication. The storage system also checks whether the write request has an HD tag 109 (decision 360). If yes, the storage system creates a new entry in the digest cache 150 (step 370).

Figure 4:
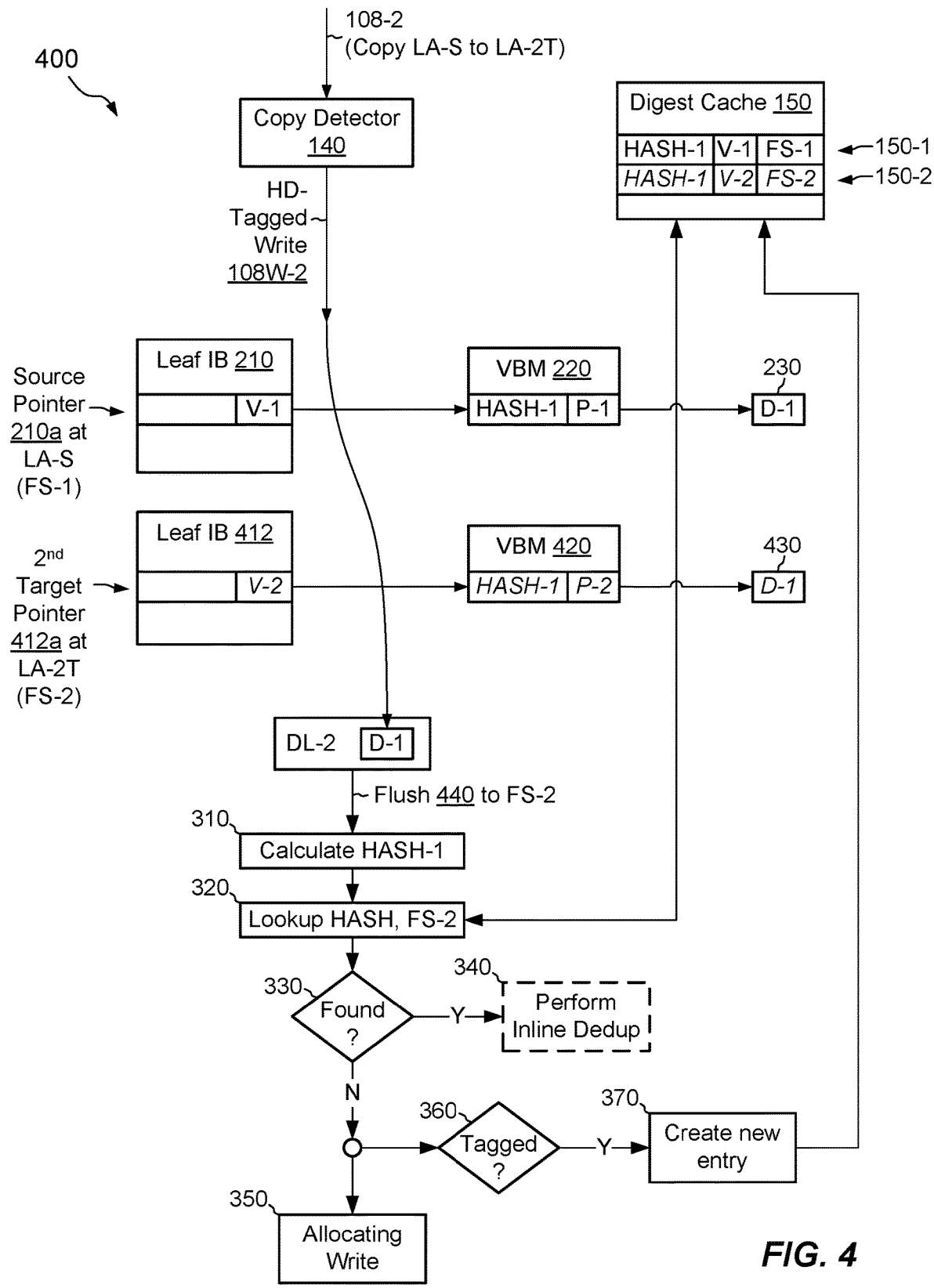
FIG. 4 is a diagram showing an example arrangement for performing a write pursuant to a copy request, where the target of the copy resides in a different deduplication domain than the source of the copy.

FIG. 4 shows an example arrangement 400 for processing a write pursuant to a copy request 108-2, which is across deduplication domains. Here, the source of the copy is LA-S, which resides in FS-1 and is the same as before, but the target is now LS-2T, which is within FS-2. Leaf IB 412 in FS-2 includes a second target pointer 412*a*, which corresponds to LS-2T. The value of pointer 412*a* (shown as "V2") may initially be empty.

In operation, copy detector 140 issues a write 108W-2 pursuant to the copy request 108-2. Write 108W-2 causes the data D-1 (same as before) to be persisted in DL-2, the data log for file system FS-2. Once the data D-1 are persisted in DL-2, the storage system may acknowledge the write 108W-2 back to the requesting host 110 or other requestor.

Later, DL-2 performs a flush 440 of D-1 to FS-2, which initiates operation of the same logic as described in FIG. 3. In this case, however, the lookup at step 320 produces a cache miss, as there is no entry in the digest cache 150 that specifies both HASH-1 (the hash of data D-1) and FS-2. As a result, decision 330 evaluates to "N" and the storage system proceeds to perform an allocating write (step 350). For example, the storage system allocates a new VBM 420 and a new data block 430. The storage system stores the data D-1 in new block 430 and updates the pointer 412*a* and the contents of VBM 420 in the manner shown.

At this time, the storage system also checks for the presence of an HD tag 109 in the write request 108W-2 (step 360). If an HD tag is found, operation proceeds to step 370, where the storage system creates a new entry 150-2 in the digest cache 150 the manner shown. Thus, the HD tag 109 on the write request 108W-2 triggers the creation of a new entry in the digest cache 150 when the lookup at step 320 produces a cache miss. The result is to seed the digest cache 150 with an entry that will support inline deduplication in the event that another write arrives, which is pursuant to another copy request specifying the same source and a different target in FS-2. Should another such write arrive, the write will produce a cache hit at step 320, allowing an inline deduplication to take place, in the same manner as described in connection with FIG. 3.

The HD-tag 109 thus serves both to trigger creation of new entries upon reads (FIG. 2) and to trigger creation of new entries upon writes (FIG. 4), for writes that result in cache misses.

FIG. 5 shows an example method 500 that may be carried out in connection with the environment 100 and provides a summary of some of the activities described above. The method 500 is typically performed, for example, by the software constructs described in connection with FIG. 1, which reside in the memory 130 of the storage processor 120 and are run by the set of processing units 124. The various acts of method 500 may be ordered in any suitable way. Accordingly, embodiments may be constructed in which acts are performed in orders different from that illustrated, which may include performing some acts simultaneously.

At 510, a copy request 108-1 is received that specifies copying of a set of data D-1 from a source logical address LA-S to a target logical address LA-T. The data storage system 116 provides a source pointer 210a for the source logical address LA-S and a target pointer 212a for the target logical address LA-T. The source pointer 210a has a value V-1 that points to the set of data D-1, e.g., directly or indirectly, such as via one or more VBMs.

At 520, when reading the set of data D-1 from the source logical address LA-S pursuant to the copy request 108-1, a digest-caching operation is performed by (i) obtaining a hash digest HASH-1 of the set of data D-1 and (ii) creating an entry 150-1 in a digest cache 150. The entry 150-1 stores the hash digest HASH-1 of the set of data D-1 and the value V-1 of the source pointer 210a.

At 530, when writing the set of data D-1 to the target logical address LA-T pursuant to the copy request 108-1, (i) the hash digest HASH-1 of the set of data D-1 is calculated, (ii) a lookup 320 into the digest cache 150 for the calculated hash digest HASH-1 is performed, and (iii) upon finding 330 the calculated hash digest HASH-1 in the entry 150-1 of the digest cache 150, an inline deduplication operation 340 is performed by setting the target pointer 212a to the value V-1 of the source pointer 210a as provided in the entry 150-1 of the digest cache 150, such that both the source pointer 210a and the target pointer 212a point to the set of data D-1.

An improved technique has been described for storing data in a data storage system 116. The technique detects that a read 108-R1 is being performed pursuant to a data copy request 108-1. In response, the data storage system 116 stores a digest HASH-1 of the data D-1 being read in an entry 150-1 of a digest cache 150. Later, when a write 108W1 pursuant to the same copy request 108-1 arrives, the storage system 116 obtains the entry 150-1 from the digest cache 150 and completes the write request 108W-1 without creating a duplicate copy of the data D-1.

Advantageously, the improved technique leverages the fact that a write of data closely follows a read of the same data when performing a copy. Deduplication activities may thus apply information about the data, which is acquired when performing the read, to improve the efficiency of data processing when performing the write.

Having described certain embodiments, numerous alternative embodiments or variations can be made. For example, although the source pointer 210a and target pointer 212a have been shown as being disposed within indirect blocks, this is merely an example. Alternatively, the source pointer and target pointer may reside within other metadata, such as VBMs or the like.

Also, although deduplication domains as described herein are defined by file systems, one should appreciate that the principles herein also apply to deduplication domains applied to other structures, such as volumes, groups of volumes, sets of storage drives, and the like.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 550 in FIG. 5). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of copying data in a data storage system, the method comprising:
   receiving a copy request that specifies copying of a set of data from a source logical address to a target logical address, the data storage system providing a source pointer for the source logical address and a target pointer for the target logical address, the source pointer having a value that points to the set of data;
   when reading the set of data from the source logical address pursuant to the copy request, performing a digest-caching operation by (i) obtaining a hash digest of the set of data and (ii) creating an entry in a digest cache, the entry storing the hash digest of the set of data and the value of the source pointer; and
   when writing the set of data to the target logical address pursuant to the copy request, (i) calculating the hash digest of the set of data, (ii) performing a lookup into the digest cache for the calculated hash digest, and (iii) upon finding the calculated hash digest in the entry of the digest cache, performing an inline deduplication operation by setting the target pointer to the value of the source pointer as provided in the entry of the digest cache, such that both the source pointer and the target pointer point to the set of data.

2. The method of claim 1,
   wherein reading the set of data is performed by processing a read request by the data storage system,
   wherein processing the read request includes applying an HD (highly-dedupable) tag to the read request, and wherein the digest-caching operation is performed in response to detecting that an HD tag has been applied to the read request.

3. The method of claim 2, wherein applying the HD tag to the read request is performed in response to detecting that the read request is issued pursuant to a copy request.

4. The method of claim 3 wherein, when performing the digest-caching operation, obtaining the hash digest of the set of data is performed by accessing the hash digest from memory-resident mapping metadata for mapping the source logical address to the set of data.

5. The method of claim 3 wherein, when performing the digest-caching operation, obtaining the hash digest of the set of data is performed by calculating the hash digest from the set of data after reading the set of data.

6. The method of claim 3, wherein the data storage system is configured to maintain multiple deduplication domains, wherein the digest cache is global to the multiple deduplication domains, and wherein creating the entry in the digest cache for the set of data further includes storing, in the entry, an identifier of a deduplication domain in which the source logical address is located.

7. The method of claim 6, further comprising:
receiving a second copy request that specifies copying of the set of data from the source logical address to a second target logical address, the second target logical address residing in a second deduplication domain different from that of the source logical address; and
when writing the set of data to the second target logical address pursuant to the second copy request, (i) calculating the hash digest of the set of data, (ii) performing a lookup into the digest cache for both the calculated hash digest and an identifier of the second deduplication domain, and (iii) upon failing to find any entry in the digest cache that matches both the calculated hash digest and the identifier of the second deduplication domain, completing a write operation of the set of data without performing an inline deduplication operation.

8. The method of claim 7,
wherein the data storage system provides a second target pointer for the second target logical address, the second target pointer having a value that points to the set of data stored in the second deduplication domain, and
wherein, upon failing to find any entry in the digest cache that matches both the calculated hash digest and the identifier of the second deduplication domain, the method further comprises creating a new entry in the digest cache, the new entry storing (i) the hash digest of the set of data, (ii) the value of the second target pointer, and (iii) an identifier of the second deduplication domain.

9. The method of claim 8,
wherein writing the set of data pursuant to the second copy request is performed by issuing a write request that includes an HD (highly-dedupable) tag, the tag applied to the write request in response to detecting that the write request was issued pursuant to a copy request, and
wherein creating the new entry in the digest cache is contingent upon detecting the HD tag in the write request.

10. The method of claim 6, wherein the data storage system maintains the deduplication domains as respective file systems, and wherein storing the identifier of the deduplication domain in the entry of the digest cache includes storing a file system identifier of the file system in which the source logical address is located.

11. The method of claim 10, wherein the source logical address is a logical address within a source file and wherein the target logical address is a logical address within a target file.

12. The method of claim 11, wherein the source file and the target file reside within different file systems in the data storage system.

13. A computerized apparatus, comprising control circuitry that includes a set of processing units coupled to memory, the control circuitry constructed and arranged to:
receive a copy request that specifies copying of a set of data from a source logical address to a target logical address, the computerized apparatus providing a source pointer for the source logical address and a target pointer for the target logical address, the source pointer having a value that points to the set of data;
when reading the set of data from the source logical address pursuant to the copy request, perform a digest-caching operation by (i) obtaining a hash digest of the set of data and (ii) creating an entry in a digest cache, the entry storing the hash digest of the set of data and the value of the source pointer; and
when writing the set of data to the target logical address pursuant to the copy request, (i) calculate the hash digest of the set of data, (ii) perform a lookup into the digest cache for the calculated hash digest, and (iii) upon finding the calculated hash digest in the entry of the digest cache, perform an inline deduplication operation by setting the target pointer to the value of the source pointer as provided in the entry of the digest cache, such that both the source pointer and the target pointer point to the set of data.

14. A computer program product including a set of non-transitory, computer-readable media having instructions which, when executed by control circuitry of a computerized apparatus, cause the control circuitry to perform a method for copying data, the method comprising:
receiving a copy request that specifies copying of a set of data from a source logical address to a target logical address;
providing a source pointer for the source logical address and a target pointer for the target logical address, the source pointer having a value that points to the set of data;
when reading the set of data from the source logical address pursuant to the copy request, performing a digest-caching operation by (i) obtaining a hash digest of the set of data and (ii) creating an entry in a digest cache, the entry storing the hash digest of the set of data and the value of the source pointer; and
when writing the set of data to the target logical address pursuant to the copy request, (i) calculating the hash digest of the set of data, (ii) performing a lookup into the digest cache for the calculated hash digest, and (iii) upon finding the calculated hash digest in the entry of the digest cache, performing an inline deduplication operation by setting the target pointer to the value of the source pointer as provided in the entry of the digest cache, such that both the source pointer and the target pointer point to the set of data.

15. The computer program product of claim 14,
wherein reading the set of data is performed by processing a read request by the data storage system,
wherein processing the read request includes applying an HD (highly-dedupable) tag to the read request in response to detecting that the read request is issued pursuant to a copy request, and wherein the digest-caching operation is performed in response to detecting that an HD tag has been applied to the read request.

16. The computer program product of claim 15 wherein, when performing the digest-caching operation, obtaining the hash digest of the set of data is performed by accessing the hash digest from memory-resident mapping metadata for mapping the source logical address to the set of data.

17. The computer program product of claim 15, wherein the method further comprises maintaining multiple deduplication domains, wherein the digest cache is global to the multiple deduplication domains, and wherein creating the entry in the digest cache for the set of data further includes storing, in the entry, an identifier of a deduplication domain in which the source logical address is located.

18. The computer program product of claim 17, further comprising:
   receiving a second copy request that specifies copying of the set of data from the source logical address to a second target logical address, the second target logical address residing in a second deduplication domain different from that of the source logical address; and
   when writing the set of data to the second target logical address pursuant to the second copy request, (i) calculating the hash digest of the set of data, (ii) performing a lookup into the digest cache for both the calculated hash digest and an identifier of the second deduplication domain, and (iii) upon failing to find any entry in the digest cache that matches both the calculated hash digest and the identifier of the second deduplication domain, completing a write operation of the set of data without performing an inline deduplication operation.

19. The computer program product of claim 18, wherein the method further comprises:
   providing a second target pointer for the second target logical address, the second target pointer having a value that points to the set of data stored in the second deduplication domain, and
   wherein, upon failing to find any entry in the digest cache that matches both the calculated hash digest and the identifier of the second deduplication domain, creating a new entry in the digest cache, the new entry storing (i) the hash digest of the set of data, (ii) the value of the second target pointer, and (iii) an identifier of the second deduplication domain.

20. The computer program product of claim 19,
   wherein writing the set of data pursuant to the second copy request is performed by issuing a write request that includes an HD (highly-dedupable) tag, the tag applied to the write request in response to detecting that the write request was issued pursuant to a copy request, and
   wherein creating the new entry in the digest cache is contingent upon detecting the HD tag in the write request.

21. The method of claim 1, wherein the digest-caching operation is performed in response to processing a read request pursuant to the copy request.

* * * * *